Sept. 29, 1970           G. L. FULTON           3,530,993

STRAINER VALVES

Filed Sept. 19, 1968           3 Sheets-Sheet 1

INVENTOR.
GARLAND L. FULTON
BY

ATTORNEYS.

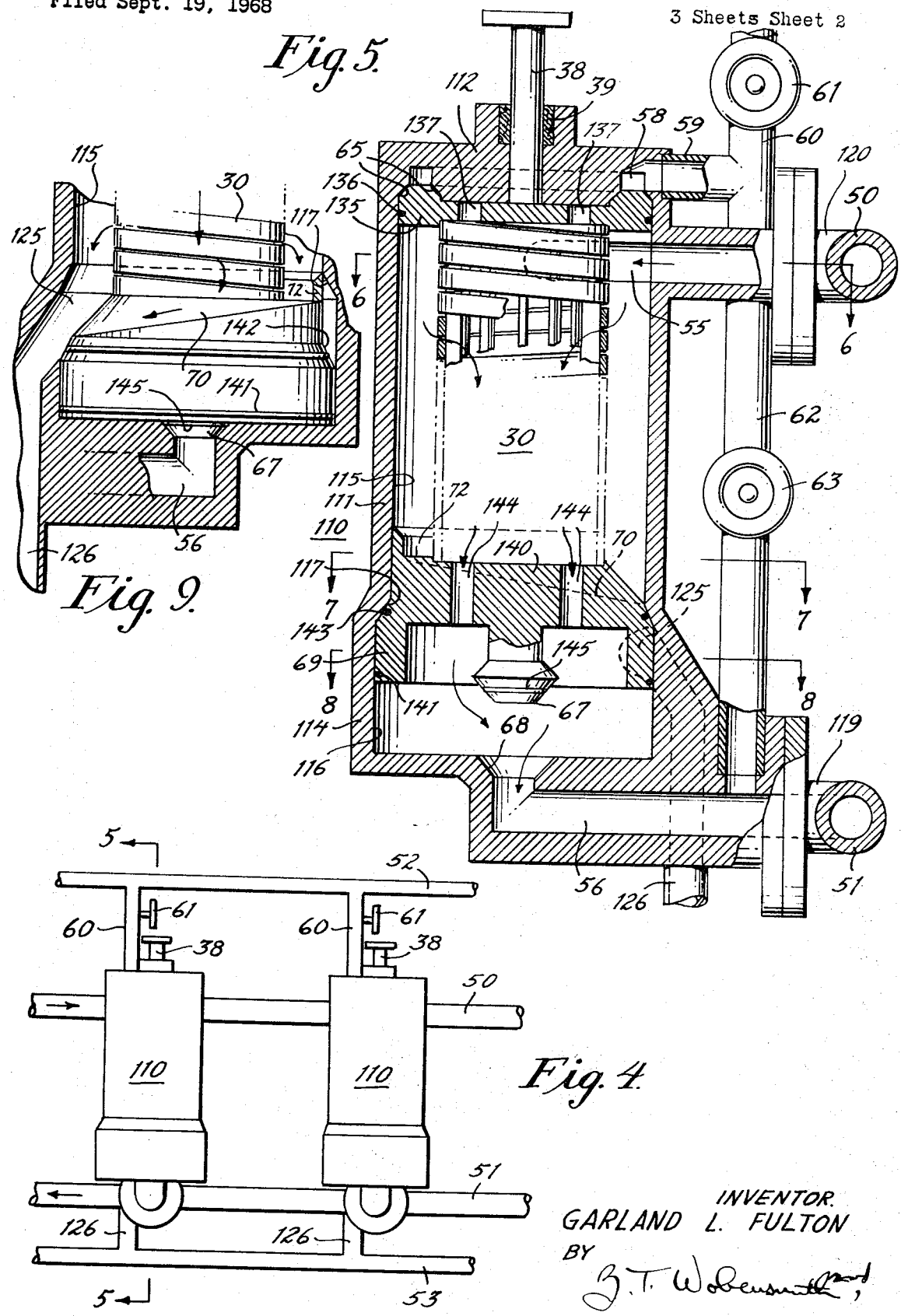

Sept. 29, 1970   G. L. FULTON   3,530,993
STRAINER VALVES
Filed Sept. 19, 1968   3 Sheets-Sheet 3

INVENTOR.
GARLAND L. FULTON
BY
ATTORNEYS.

United States Patent Office 3,530,993
Patented Sept. 29, 1970

3,530,993
STRAINER VALVES
Garland L. Fulton, 1428 Woodford Drive,
Wayne, Pa. 19087
Filed Sept. 19, 1968, Ser. No. 760,819
Int. Cl. B01d 29/38
U.S. Cl. 210—411                    9 Claims

ABSTRACT OF THE DISCLOSURE

A strainer valve having a housing with aligned bores, a contaminated fluid supply connection, a clean fluid delivery connection and a flushing discharge connection. The housing has a strainer therein with a disc at one end and a valve plug at the other. The strainer is movable from a fluid particle separating or straining position to a position for back flushing in the opposite direction through the strainers. The valves may be connected in parallel for increased capacity. Flushing may be by clean fluid, the contaminated fluid or by an auxiliary fluid.

BACKGROUND OF THE INVENTION

Field of the invention

This invention relates to strainer valves and more particularly to a strainer and associated valves which in one position effects the fluid straining action and in another position is back flushed for cleaning.

Description of the prior art

It is heretofore been proposed to provide strainers with back flushing for cleaning such as in the U.S. patents to Collin, No. 1,438,983, and English, No. 1,914,012 and Maunula, No. 2,532,177, but in these the filter is at a fixed location.

It has also been proposed to move the screens for the purpose of backwashing as in the U.S. patents to Clarke, No. 1,340,599 and Wardle, No. 2,007,780.

The prior devices are complicated in construction and have not related the straining medium to the control valving in a simple but effective manner.

SUMMARY OF THE INVENTION

In accordance with the invention, a strainer valve is provided which includes a housing within which the strainer is slidably mounted for positioning by an external operation, the strainer having valve plugs movable therewith for controlling parts in the housing. In one position of the strainer and valve plugs a straining action is effected while in another position back flushing of the strainer for cleaning is effected. The cleaning may be effected by external flushing fluid, back flushing with discharged liquid, or by use of the contaminated fluid as the backing flushing fluid.

It is the principal object of the present invention to provide a straining device which combines the features of an efficient straining medium with a valving system for back flushing the strainer for cleaning the strainer.

It is a further object of the present invention to provide a straining device of the character aforesaid in which the strainer is linearly moved by an external operating device.

It is a further object of the present invention to provide a straining device in which the strainer may have any desired particle separation over a wide range, but with efficient cleaning of the strainer when desired.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which:

FIG. 4 is a view in elevation showing another form of strainer valve in accordance with the invention in multiple and connected to a system of manifolds;

FIG. 5 is a central sectional view, enlarged, of one of the strainer valves shown in FIG. 4;

FIG. 9 is a view partly in elevation and partly in section of a part of the structure of FIG. 5 and in the flushing position.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Figure 2:
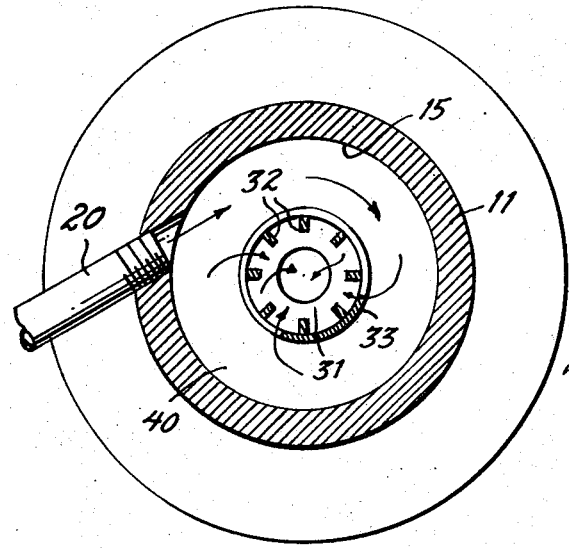
FIG. 2 is a transverse sectional view taken approximately on the line 2—2 of FIG. 1.
Figure 1:
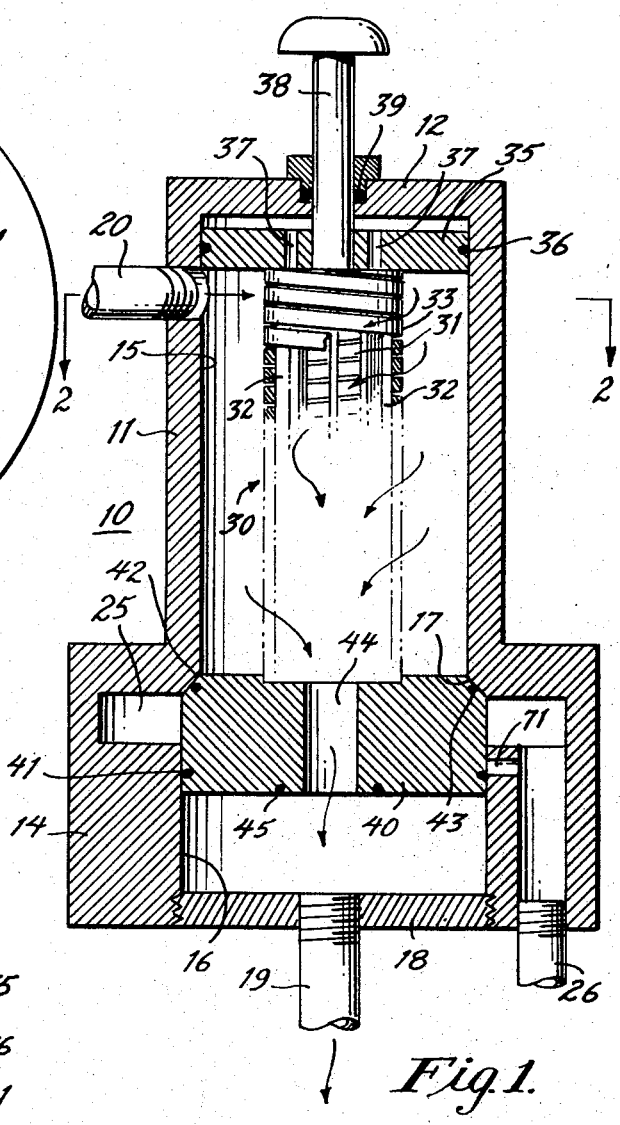
FIG. 1 is a central sectional view of one form of strainer valve in accordance with the invention, and in the position for particle separation by the strainer.
Figure 3:
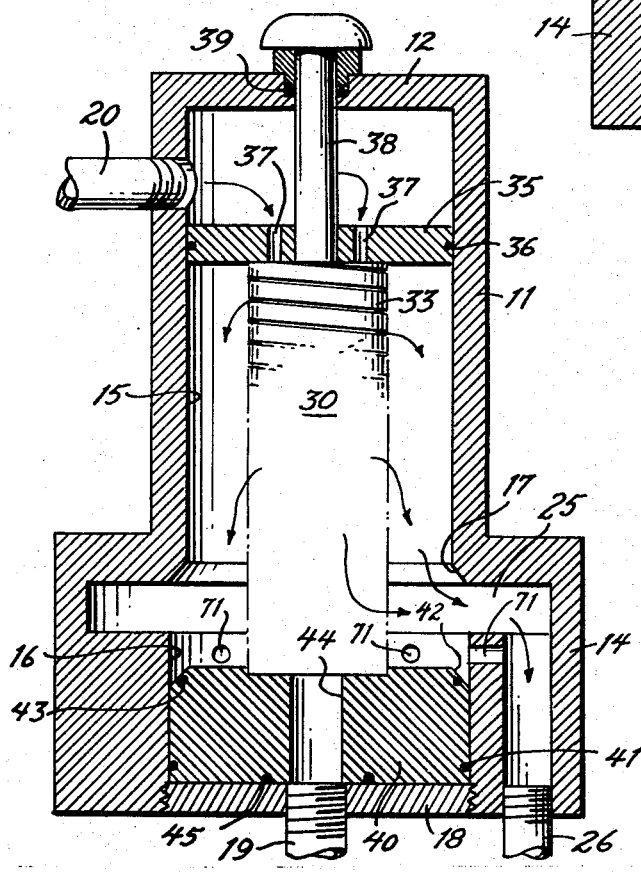
FIG. 3 is a central sectional view of the strainer valve of FIG. 1, in the position for back flushing.
Figure 6:
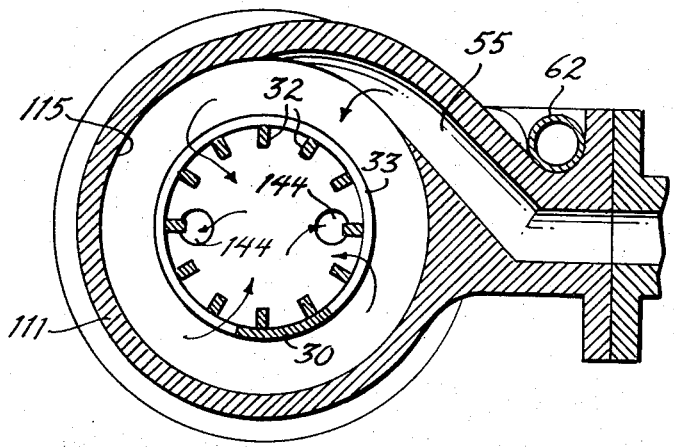
FIG. 6 is a transverse sectional view taken approximately on ilne 6—6 of FIG. 5.
Figure 7:
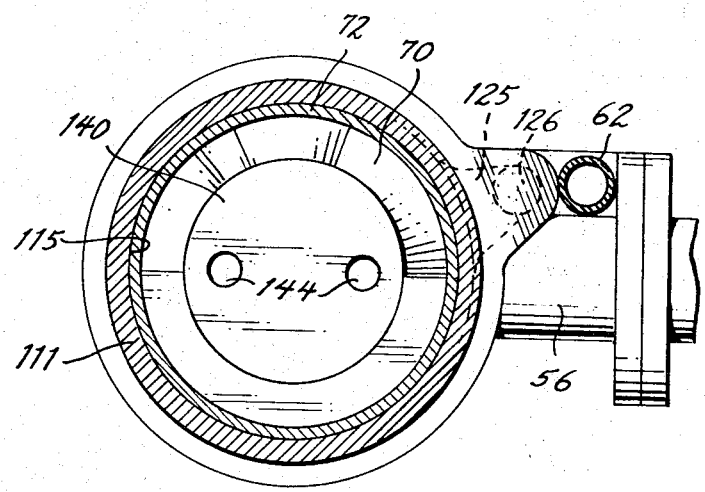
FIG. 7 is a transverse sectional view taken approximately on the line 7—7 of FIG. 5.
Figure 8:
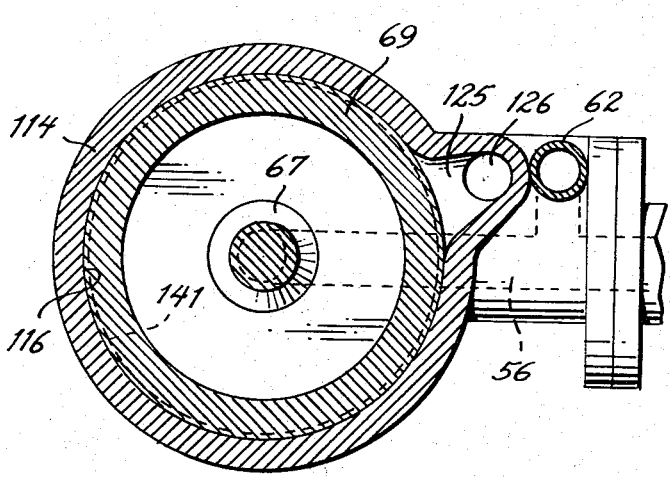
FIG. 8 is a transverse sectional view taken approximately on the line 8—8 of FIG. 5.

Referring now more particularly to FIGS. 1 to 3, inclusive, the form of strainer valve there shown includes a housing 10 with a cylindrical wall 11 and an end closure wall 12. The cylindrical wall 11 has an extension thereof a cylindrical wall 14. The wall 11 has an interior bore 15 and the wall 14 has an interior bore 16 coaxial therewith. The bore 15 is terminated at a valve seat 17 and the bore 16 is closed by a removable closure plug 18 which has a pipe 19 connected thereto.

The bore 15 in spaced relation to the end closure wall 12 has a contaminated fluid inlet pipe 20 connected thereto preferably substantially tangentially, to provide a swirling flow of fluid into the bore 15.

The bore 16, between the valve seat 17 and the closure plug 18, preferably has a flushing fluid discharge port 25 to which a sludge discharge pipe 26 is connected.

A strainer 30 is provided, preferably cylindrical in shape with a central longitudinal opening 31, and may correspond to the internal diameters of conventional pipe sizes up to about 2 inch I.D.

The strainer 30 can be of any desired porous or foraminous construction as determined by the sizes of particles to be separated from the contaminated fluid.

In the particular embodiment of strainer 30 which is illustrated, the strainer comprises a plurality of longitudinal strips 32 with a helical band 33 secured thereto, the spacing between the turns of the band 33 determining the size of particles to be separated. In a specific embodiment the distance between the turns can be 0.002 inches.

The strainer 30 preferably has secured thereto an end disc 35 with packings 36 slidable in and providing a guide in the bore 15. The disc 35 may optionally have fluid passageways 37 communicating with the central opening 31. If the fluid passageways 37 are omitted the end disc 35 in lowered position serves as a valve plug and can shut off communication of the pipe 20 therebelow. The use of the fluid passageways 37 permits of employing the fluid entering through the pipe 20 to be used for back flushing.

The disc 35 has an operating rod 38 secured thereto and extending through a packing 39 in the end closure wall 12. The operating rod 38 may be actuated in any desired manner such as by a fluid actuated or electrically actuated motor (not shown) or manually.

The strainer 30, at the other end thereof, has a valve plug 40 secured thereto and slidable in the bore 16. The plug 40 can have a packing 41, such as an O-ring, in the periphery thereof, preferably has a beveled edge 42 for seating on the valve seat 17. The edge 42, to improve the sealing action thereof and to reduce the accuracy of machining required can have a seal 43, such as an O-ring, carried thereby.

The plug 40 has a fluid passageway 44 therethrough and also provided with a seal 45, such as an O-ring, to prevent fluid leakage from the pipe 19 and passageway 44, if desired. Flushing ports 46 may be provided for cleaning and to prevent solids retention on the plug 40 or on the edge 42.

It will be noted that the plug 40 is dimensioned so as to close off the port 25 in its upper position and open the port 25 in its lower position.

In use, the strainer 30 is in the upper position illustrated in FIG. 1, with the disc 35 above and inlet pipe 20, and with the beveled edge 42 seated on the valve seat 17.

Contaminated fluid entering the bore 15 from the pipe 20 has a swirling action imparted thereto, and at the screen 30 separation of particles is effected. The fluid freed from the detained particles passes in and along the central opening 31, and the passageway 44 and thence in the bore 16 to the pipe 19 for delivery.

If, after a period of particle separating action, it is desired to back flush and clean the screen 30 the rod 38 is actuated to move the screen 30 and its associated disc 35 and plug 40 downwardly to the position shown in FIG. 3.

Two options for back flushing are available.

The contaminated fluid may be employed for flushing. The fluid entering through the pipe 20, passes in the bore 15 to and through the passageways 37 to the central opening 31 then outwardly through the screen 30 and to the port 25 and pipe 26 for discharge.

If the fluid passageways 37 are not employed back flushing can be effected by fluid delivered in a reverse direction through the pipe 19 to the central opening 31 then outwardly through the screen 30, and to the port 25 and pipe 26 for discharge.

Upon completion of the back flushing the screen 30 and its associated disc 35 and plug 40 are then returned by movement of the rod 38 to their initial positions.

Referring now to FIGS. 4 to 9, another embodiment of the invention is shown which is particularly suited for multiple use of the strainer valves, preferably with a group in parallel.

In FIG. 4 a plurality of pipes are shown with a contaminated fluid pipe 50, a clear fluid delivery pipe 51, a flushing fluid supply pipe 52 and a flushing fluid discharge pipe 53.

Each of the strainer valves in FIG. 4 as shown in FIGS. 5 to 9 includes a housing 110 with a cylindrical wall 111, end closure wall 112, cylindrical wall 114 and bores 115 and 116. The inlet pipe 120 is connected to the pipe 50 and the housing 110 has a passageway 55 to provide a swirling flow of fluid in the bore 115.

The fluid connection 56 from the bore 116 is connected by a pipe 119 to the pipe 51.

The discharge port 125 is connected by a pipe 126 to the pipe 53.

The bore 115 has a port 58 connected by a pipe 59 to a pipe 60 which is connected through a shut off valve 61 to the pipe 52. A pipe 62 is also provided from the pipe 119 to the pipe 59 with a shut off valve 63 provided therein.

The strainer 30 has a disc 135 secured thereto with a seating ring 64 engageable with a valve seat 65 to cut off fluid from the pipe 59 and has fluid passageways 137. The actuating rod 38 passes through the packing 39.

The valve plug 140 has openings 144, has a beveled edge 142 to seal on a valve seat 117 and has a downwardly extending plug 67 seating in a valve seat 68 to shut off flow through the passageway 56, has a downwardly extending rim 69 which controls the port 125 and, outside the screen 30 has an inclined rim 70 to establish communication with the port 125 in the downward position of the screen 30. The valve plug 140 also has an upwardly extending rim 71 interrupted at the port 125 to direct contaminants to that port and prevent movement to the space above the rim 69 when the rim 69 is in its downward position (FIG 9).

Packings 136, 141, 143 and 145 can also be provided, O-rings being suitable.

The operation of the strainer valve of FIGS. 4 to 9, inclusive, is similar to the operation previously described for the other form.

With the strainer 30 in its upper position contaminated fluid is supplied from the pipe 50 and through the pipe 120 and passageway 55 to the bore 115. The screen 30 removes the particles as determined by its characteristics and the clean fluid passes from the central opening 31 through the openings 144 and bore 116 to the fluid connection 56 and thence through the pipe 119 to the pipe 51.

The pipe 59 is sealed off by the disc 135 and the port 125 is sealed off by the rim 69. The valves 61 and 63 are preferably closed. If, now, it is desired to clean the strainer 30 the actuating rod 38 is moved to move the strainer 30 and its associated disc 135 and valve plug 140 downwardly to their lowermost positions.

This causes the port 58 to be opened, the port 125 to be opened, and the valve plug 67 to engage seat 68 and shut off flow to the passageway 56.

Fluid for flushing is available from pipe 52 with valve 61 open and valve 63 closed, and passes through openings 137 to the central opening 31 and then outwardly through the strainer 30 and to the port 125 and pipe 126 to the pipe 53.

Fluid for flushing is also available through pipe 62 with valve 61 closed and valve 63 open, so that flushing may be effected with clean fluid.

It will thus be seen that a strainer valve has been provided having a wide range of adaptability.

I claim:
1. A strainer valve comprising
   a housing having an interior portion with a contaminated fluid inlet, a clean delivery fluid connection and a flushing fluid outlet in communication therewith,
   a hollow strainer member having a disc member connected thereto to one end and a valve plug member connected thereto at the other end thereof,
   said members being slidably mounted in said interior portion and having one position for straining fluid from said inlet to said fluid connection, and another position for reverse passage of fluid through said strainer member,
   said valve plug member having a portion for shutting off flow through said flushing fluid outlet in said one position.
2. A strainer valve as defined in claim 1 in which said fluid inlet is positioned to provide a whirling flow with respect to said strainer member.
3. A strainer valve as defined in claim 1 in which said disc member has openings therethrough for delivering fluid to the interior of said strainer member in said other position of said members.
4. A strainer valve as defined in claim 1 in which said plug member has an opening therethrough for delivery of fluid to said fluid connection.
5. A strainer valve as defined in claim 1 in which an actuator rod is connected to said strainer member for longitudinal movement thereof.

6. A strainer valve as defined in claim 1 in which
an auxiliary fluid connection is provided, and
said disc member has a portion for controlling said fluid connection.

7. A strainer valve as defined in claim 6 in which
said auxiliary fluid connection has a pipe communicating therewith and with said fluid connection, and
a control valve is provided for controlling the delivery of fluid to said auxiliary connection.

8. A strainer valve as defined in claim 1 in which
an additional housing and said members are provided in parallel with said first fluid inlet and delivery fluid connection.

9. A strainer valve as defined in claim 1 in which
said housing has aligned bores in one of which said disc member is mounted and in another of which said valve plug member is mounted, and
a valve seat for said valve plug member is provided at the terminus of one of said bores,
said valve plug member portion being engageable with said valve seat.

References Cited

UNITED STATES PATENTS

| | | | |
|---|---|---|---|
| 191,131 | 5/1877 | Gainey | 210—411 X |
| 1,216,547 | 2/1917 | Collin | 210—426 |
| 1,340,599 | 5/1920 | Clarke | 210—411 X |
| 3,216,572 | 11/1965 | Kasten | 210—97 |

JOHN W. ADEE, Primary Examiner

U.S. Cl. X.R.

210—422, 426